June 2, 1959 W. J. LINN 2,889,214
LIQUID FUEL ATOMIZERS
Filed May 7, 1956

William J. Linn
INVENTOR.
BY Ralph Donath
Attorney

United States Patent Office 2,889,214
Patented June 2, 1959

2,889,214

LIQUID FUEL ATOMIZERS

William J. Linn, Pittsburgh, Pa.

Application May 7, 1956, Serial No. 583,100

9 Claims. (Cl. 48—180)

This invention relates to liquid fuel atomizers and fuel and air mixers and particularly to atomizers used in connection with the fuel and air charging ducts in carburetors and inlet manifolds of internal combustion engines for improving the degree of mixing and the quality of the explosive mixture delivered to the combustion chamber.

Various structures have been suggested for the purpose of atomizing air and fuel, none of which, however, is completely successful for the purpose. As a result raw and unatomized liquid fuels enter the combustion chambers of the engine. This raw unatomized fuel and droplets of fuel unmixed with air are undesirable in the combustion chamber since they tend to pass around the piston rings during the compression stroke of the engine and to pass into the crankcase where they dilute the oil, cause excessive wear and excessive carbon build up. These difficulties can be eliminated by a more complete atomization of the fuel.

An object of this invention is to provide means for atomizing all of the liquid fuel in the air and fuel charging duct.

Another object of this invention is to provide means for collecting all of the unatomized fuel formed along the walls of the fuel and air charging duct and charging them into the fuel and air mixtures as atomized fuel.

A further object of this invention is to provide means for creating a large central venturi action surrounded by a substantially continuous area of peripheral venturi.

Other objects, advantages and features of the invention will become apparent from a consideration of the following description and the accompanying drawings in which.

Figure 1:
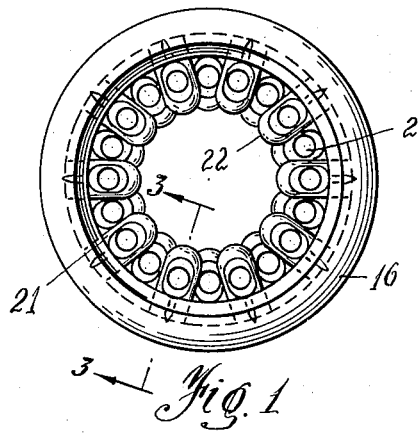
Figure 1 is a top plan view of a preferred embodiment of this invention.

Referring to the drawings there is illustrated a conventional manifold inlet 10 having a flange 11 connected to a flange 12 of a carburetor barrel 13 thereby forming a passage 14 hereinafter termed fuel and air charging duct.

Carburetor manifold combinations of this type are generally old and will at best supply only partially atomized fuel to the engine. Such a combination is subject to all of the evils mentioned above which are characteristic of ordinary carburetors.

In a preferred form of this invention a flow velocity changing means 15 is inserted into the air and fuel charging duct 14 by means of a flange 16 whose outer extremity is feathered to insert between the inner edges of the carburetor flange 12 and the manifold flange 11. The flow velocity changing means 15 has an outer wall 17 from which flange 16 projects radially. The outer wall 17 is provided with a thin walled inturned flange 18 forming with the flange 16 and the inner wall of the carburetor a well 19 which collects the fuel drops which gather on the walls of the carburetor.

The flow velocity changing means is in the form of a cylinder having a restricting ridge 20 adjacent the entrance end. This ridge restricts the flow of gases causing them to flow faster through the restricted area than on either side thereof. A plurality of short radially extending diffuser members 21 having hemispherical tips 22 are spaced in two staggered rows about the interior of the flow velocity changing means to form a central cylindrical passage axially of the flow velocity changing means surrounded by a substantially continuous band of diffuser members. Each diffuser member 21 has a venturi opening 23 therethrough parallel to the axis of the flow velocity changing means.

Spaced openings 24 are provided through the flange 18 in to the well 19 above each venturi opening 23 and immediately above the restricting ridge 20. This causes the liquid fuel collected in the well 19 to be aspirated into the stream of fuel and air passing through the fuel and air flow velocity changing means.

Figure 4:
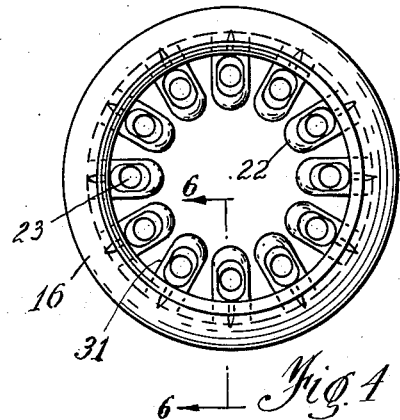
Figure 4 is a top plan view of a second embodiment of this invention.
Figure 2:
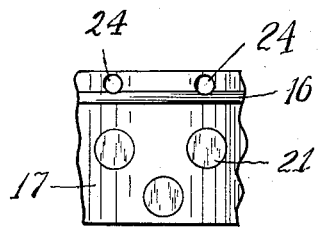
Figure 2 is a segment of the outer periphery of the embodiment of Figure 1 in side elevation.
Figure 5:
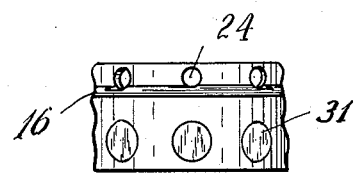
Figure 5 is a segment of the outer periphery of the embodiment of Figure 4 in side elevation.
Figure 3:
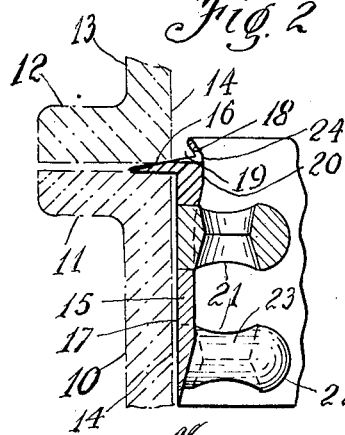
Figure 3 is a section on the line 3—3 of Figure 1.
Figures 6, 7:
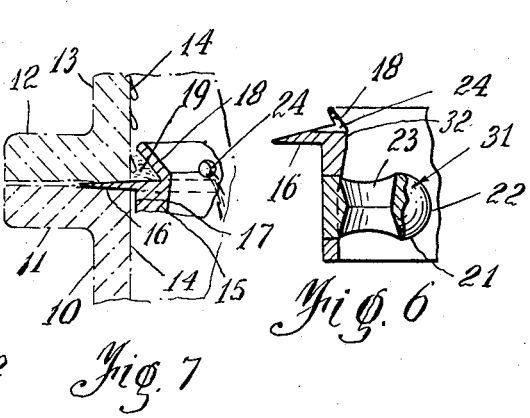
Figure 6 is a section on the line 6—6 of Figure 4.
Figure 7 is an enlarged segment of the section of Figure 3 showing in detail the means for collecting fuel condensed on the duct walls.

In Figures 4, 5 and 6 there is illustrated a second embodiment of this invention in which a single circumferential row of diffuser members 31 are provided directly beneath the restricting ridge 32 in the same manner as diffuser member 21 of Figures 1, 2 and 3 to form a substantially continuous band of side by side circumferential venturi. As noted in the drawings, and particularly in Figures 1, 3, 4 and 6, the diffuser members 21 and 31 are of a length which extends radially-inwardly into the flow-velocity-changing means a minimum distance. An optimum operating efficiency is obtained when this minimum distance is substantially equal to the maximum diameter of the venturi opening 23, plus the radius of the rounded or hemispherical ends 22. It is to be understood, of course, that slight variances in the length of the diffuser members, such as encountered in manufacture and fabrication, will not adversely affect the optimum obtainable operating efficiency.

In operating an internal combustion engine having the device of this invention, the liquid fuel is introduced into the carburetor barrel from the fuel jet in the usual manner. The fuel is then picked up by a stream of air and carried along the duct. A considerable portion of the fuel collects in the form of large drops along the walls of the duct. This portion of the fuel normally passes unmixed with air into the cylinders. With the device of this invention however, this portion of the fuel is collected in the well 19 behind the sloping flange 18 from which it is reintroduced into the stream of fuel and air through the openings 24 directly above the ridge 20 and diffuser venturi 23. The main stream of fuel and air passes through between the ridge 20 where it is alternately accelerated and decelerated thereby causing a more thorough comingling of the fuel and air.

This comingling is not sufficient for maximum efficiency. In order to accomplish this the fuel is passed through a second venturi formed by the hemispherical ends of the circumferentially spaced diffusers. A portion of the mixture adjacent the internal wall tends to travel more slowly than the central core and consequently there is less mixing action. In order to cause a thorough mixing along this internal periphery and to assure thorough mixing of the liquid entering through openings 24 the fuel and air along the wall are passed through the band of venturis 23 in the diffusers 21 forming the restricting ridge of the central venturi. In this way the fuel and air mixture along the wall is accelerated to a speed commensurate with that of the central core and the entire mass is admixed to provide a more homogeneous, economical and cleaner burning mixture.

Although several presently preferred embodiments of this invention have been illustrated it will be understood that it may be otherwise embodied within the scope of the following claims.

I claim:

1. A liquid fuel atomizer for a fuel and air charging duct of an internal combustion engine comprising, a first main axial-flow velocity changing means adjacent an inlet portion of the atomizer, said means comprising a restricting ridge forming a main venturi opening, a second main axial-flow velocity changing means spaced axially from said first means and formed by a plurality of radially-inwardly-extending diffuser members spaced circumferentially around wall portions of the atomizer, said diffuser members having rounded portions forming the second main axial-flow velocity changing means with a central venturi opening for changing the velocity of flow passing centrally through the atomizer, said central venturi opening being surrounded by a plurality of venturi means within said diffuser members for changing the velocity of flow through the atomizer adjacent wall portions thereof, and said diffuser members each extending radially-inwardly from the adjacent wall portions a minimum distance substantially equal to the diameter of the venturi means, plus the extent of the rounded end portion thereof.

2. A liquid fuel atomizer for fuel and air as defined in claim 1 wherein, said plurality of venturi means within said diffuser means comprises at least one venturi opening in each diffuser member, wherein a well means is disposed circumferentially about the inner periphery of the charging duct adjacent to and radially-outwardly of said first main axial-flow velocity changing means, and wherein a plurality of discharge openings are positioned within said well means adjacent a venturi throat portion of said first main axial-flow velocity changing means with at least one such discharge opening above each venturi opening in said diffuser members.

3. A liquid fuel atomizer for a fuel and air charging duct of an internal combustion engine comprising, a first main axial-flow velocity changing means, a second main axial-flow velocity changing means spaced axially from said first means and positioned within the charging duct, said second main axial-flow velocity changing means being formed by a plurality of radially-inwardly-extending diffuser members positioned circumferentially around and adjacent the interior of the duct, said diffuser members having rounded ends forming a central venturi opening, at least one venturi opening formed in each of said diffuser members, each of said diffuser members being substantially equal in length to the maximum diameter of the venturi opening formed therein plus the radius of its rounded end, and the venturi openings in said diffuser members having means for changing the velocity of flow passing through the atomizer adjacent the inner periphery thereof.

4. A liquid fuel atomizer for fuel and air as defined in claim 3 wherein the diffuser members are arranged in a plane which is transverse to the path of flow through the charging duct.

5. A liquid fuel atomizer for fuel and air as defined in claim 3 wherein the diffuser members are arranged in offset staggered relationship in more than one plane.

6. A liquid fuel atomizer for fuel and air as defined in claim 5 wherein the diffuser members are arranged in staggered offset relationship in two planes with the diffuser members of one plane arranged above the diffuser members of the other plane in such a manner that a wall of a venturi in the upper plane is directly above a wall of another venturi in the other plane.

7. A liquid fuel atomizer for a fuel and air charging duct between a carburetor and an internal combustion engine comprising, a tubular sleeve adapted to be disposed in the duct between the carburetor and the engine, undercut well means at the input end of said sleeve formed between a radially-outwardly turned flange portion of said sleeve and the wall of the charging duct for collecting fuel drops which gather on the wall of the charging duct, an annular venturi ridge in said sleeve adjacent the bottom of said well means forming a first main axial flow velocity changing means, a plurality of circumferentially spaced-apart orifices passing through said sleeve at said annular venturi ridge and communicating between said well means and the interior of said sleeve for discharging the fuel drops collected in the well into the interior of the sleeve, second main axial-flow velocity changing means spaced axially from said first main axial-flow velocity changing means, said second main axial-flow velocity changing means formed by a plurality of arcuately spaced-apart diffuser members projecting radially-inwardly from and positioned 360 degrees around the interior of said sleeve adjacent the outlet side of said venturi ridge, said diffuser members being of equal length and having hemispherical ends forming a central venturi opening within said second main axial-flow velocity changing means, at least one individual venturi opening in each diffuser member, at least one such individual venturi opening aligned below each discharge orifice, each of said diffuser members being substantially equal in length to the diameter of the venturi opening plus the radius of its hemispherical end, and said individual venturi openings in said diffuser members forming a plurality of annularly-arranged fluid-velocity changing means positioned radially-outwardly adjacent said central venturi opening to change the velocity of flow passing through the atomizer adjacent the inner periphery of the tubular sleeve.

8. A liquid fuel atomizer for fuel and air as defined in claim 7 wherein the diffuser members are arranged within a single plane lying transversely of the longitudinal path of flow through the charging duct.

9. A liquid fuel atomizer as defined in claim 7 wherein the diffuser members are arranged in staggered offset relationship in two parallel planes which are transverse to the longitudinal path of flow through the charging duct, with one diffuser member above another, so that a wall of one venturi in a diffuser member in one transverse plane is in a common longitudinal plane with a wall of an offset diffuser member in the other transverse plane.

References Cited in the file of this patent

UNITED STATES PATENTS

| | | |
|---|---|---|
| 1,857,070 | Thomas | May 3, 1932 |
| 2,589,946 | Linn | Mar. 18, 1952 |
| 2,754,184 | Linn | July 10, 1956 |